US010989996B2

(12) United States Patent
Yui et al.

(10) Patent No.: US 10,989,996 B2
(45) Date of Patent: Apr. 27, 2021

(54) LIGHT SOURCE DEVICE AND PROJECTOR

(71) Applicant: SHARP KABUSHIKI KAISHA, Sakai (JP)

(72) Inventors: Hideomi Yui, Sakai (JP); Shigeru Aomori, Sakai (JP); Hidetsugu Matsukiyo, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/765,329

(22) PCT Filed: Nov. 9, 2018

(86) PCT No.: PCT/JP2018/041605
§ 371 (c)(1),
(2) Date: May 19, 2020

(87) PCT Pub. No.: WO2019/098125
PCT Pub. Date: May 23, 2019

(65) Prior Publication Data
US 2020/0355992 A1 Nov. 12, 2020

(30) Foreign Application Priority Data

Nov. 20, 2017 (JP) .............................. JP2017-222645

(51) Int. Cl.
*G03B 21/16* (2006.01)
*H04N 9/31* (2006.01)
*G03B 21/20* (2006.01)
*G02B 26/00* (2006.01)

(52) U.S. Cl.
CPC .......... *G03B 21/204* (2013.01); *G02B 26/008* (2013.01); *G03B 21/16* (2013.01); *H04N 9/3144* (2013.01)

(58) Field of Classification Search
CPC ..... G03B 21/204; G03B 21/16; H04N 9/3144
See application file for complete search history.

(56) References Cited

U.S. PATENT DOCUMENTS

2015/0138513 A1* 5/2015 Ichieda ................ H04N 9/3185
353/70
2016/0053981 A1 2/2016 Terasaki et al.
2016/0077326 A1 3/2016 Yamagishi et al.
(Continued)

FOREIGN PATENT DOCUMENTS

JP 2013-114840 A 6/2013
JP 2015-194716 A 11/2015
(Continued)

*Primary Examiner* — Ryan D Howard
(74) *Attorney, Agent, or Firm* — ScienBiziP, P.C.

(57) ABSTRACT

A light source device that radiates excitation light or emitted light by the excitation light, includes: an excitation light source that radiates the excitation light; a fluorescent wheel that includes a phosphor, which emits light in a predetermined wavelength range on reception of the excitation light, in a circumferential direction; a driving device that rotates the fluorescent wheel; and a shielding member that is arranged around the excitation light source and the fluorescent wheel and shields the excitation light and the emitted light, wherein an opening through which outside air is introduced is provided at a part of the shielding member.

9 Claims, 7 Drawing Sheets

(56) References Cited

U.S. PATENT DOCUMENTS

| 2017/0052434 | A1 | 2/2017 | Masuda |
| 2017/0175989 | A1 | 6/2017 | Yamagishi et al. |
| 2017/0214892 | A1 | 7/2017 | Nagatani |
| 2018/0210327 | A1* | 7/2018 | Miyagi ................ G02B 26/085 |

FOREIGN PATENT DOCUMENTS

| JP | 2016-066061 A | 4/2016 |
| JP | 2016-105122 A | 6/2016 |
| JP | 2017-116935 A | 6/2017 |
| WO | 2014/196126 A1 | 12/2014 |
| WO | 2015/166553 A1 | 11/2015 |

* cited by examiner

LIGHT SOURCE DEVICE AND PROJECTOR

TECHNICAL FIELD

The present invention relates to a light source device and a projector.

The present application claims priority based on Japanese Patent Application No. 2017-222645 filed in Japan on Nov. 20, 2017, the content of which is incorporated herein.

BACKGROUND ART

An image displayed by a projector such as a projecting device is easily influenced by external light, so that high illuminance is necessary to achieve display of good quality. For projection with high illuminance, a light amount of a light source is required to be large, so that a light source for which excitation light with high energy density such as laser light and a phosphor are combined comes into use.

However, there is a case where desired fluorescence emission intensity (brightness) is not able to be obtained only by causing the phosphor to emit light with use of the excitation light with high energy density such as laser light by an optical device or a projector. This is because, when temperature of the phosphor becomes high, a phenomenon called temperature quenching is caused, and because the temperature is more likely to become high when excitation light with high density is radiated to the phosphor than when excitation light with low density is radiated.

PTL 1 discloses a technique of a phosphor wheel device that includes a phosphor wheel which includes a disk-shaped base plate and a phosphor disposed on one surface of the base plate in a circumferential direction, a motor which rotationally drives the phosphor wheel, and a plurality of blades which are fixed to the other surface of the base plate so as to be integrally rotated with the phosphor wheel and each of which extends in a radial direction of the phosphor wheel from a rotation axis of the motor.

CITATION LIST

Patent Literature

PTL 1: Japanese Unexamined Patent Application Publication No. 2016-66061

SUMMARY OF INVENTION

Technical Problem

In the technique described in PTL 1, air around the blades are diffused by the rotating blades and heat is thereby exhausted, and a temperature rise of the phosphor is thus suppressed. However, in the technique described in PTL 1, in a case where, when excitation light with high density is used for an excitation light source of the phosphor wheel or even when the phosphor wheel device is operated for a long time, temperature of an entirety of a periphery of the phosphor wheel, which includes the blades, becomes high, it is difficult to efficiently exhaust the heat.

An embodiment of the invention is made in view of such circumstances, and aims to provide a light source device capable of achieving stable high-intensity light emission even when excitation light with high density is used or even when the light source device is operated for a long time.

Solution to Problem

In order to accomplish the aforementioned aim, an embodiment of the invention provides the following means.

That is, a light source device according to an embodiment of the invention is a light source device that radiates excitation light or emitted light by the excitation light, including: an excitation light source that radiates the excitation light; a fluorescent wheel that includes a phosphor, which emits light in a predetermined wavelength range on reception of the excitation light, in a circumferential direction; a driving device that rotates the fluorescent wheel; and a shielding member that is arranged around the excitation light source and the fluorescent wheel and shields the excitation light and the emitted light, in which an opening through which outside air is introduced is provided at a part of the shielding member.

Advantageous Effects of Invention

According to an embodiment of the invention, when temperature around a fluorescent wheel is lowered, thermal conduction from the fluorescent wheel to air is efficiently performed, so that it is possible to achieve stable high-intensity light emission even when excitation light with high density is used or even when the light source device is operated for a long time.

DESCRIPTION OF EMBODIMENTS

The inventors found that, by providing an opening in a shielding member arranged around a fluorescent wheel of a light source device, which is usually used in a state of being sealed up, temperature around the fluorescent wheel is lowered and thermal conduction from the fluorescent wheel to air is efficiently performed, and made the invention.

Thereby, the inventors realized stable high-intensity light emission even when excitation light with high density is used or even when the light source device is operated for a long time. Hereinafter, embodiments of the invention will be specifically described with reference to the drawings. In order to facilitate understanding the description, the same reference number will be given to the same component in each of the drawings, and redundant description will be omitted.

First Embodiment

[Configuration of Light Source Device]

Figure 1:
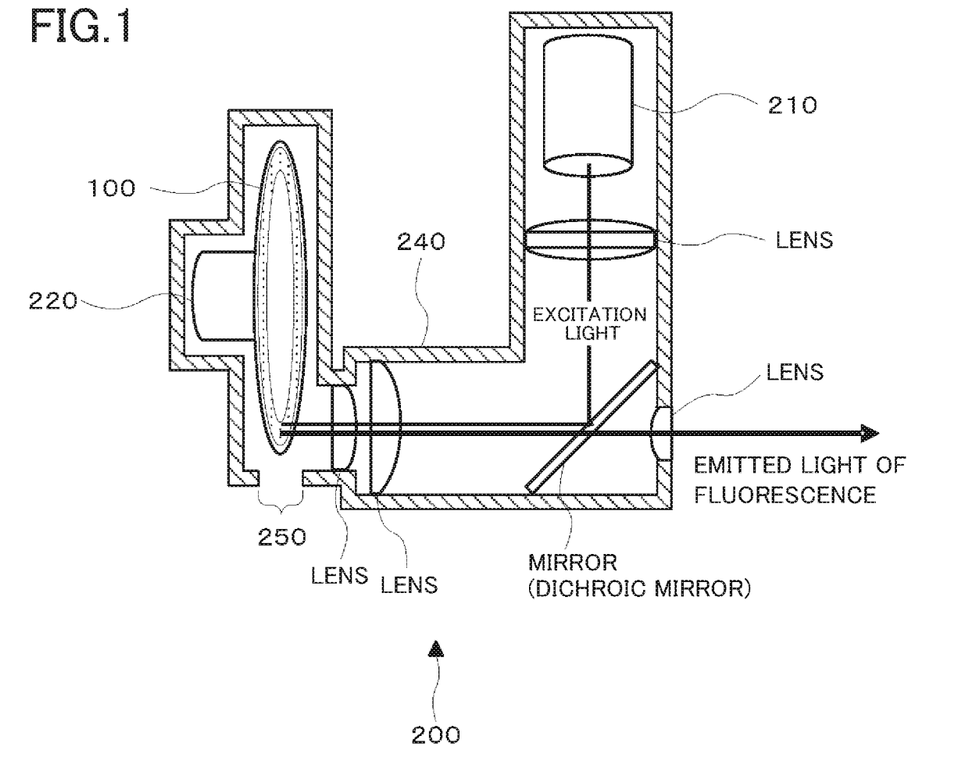
FIG. 1 is a conceptual view of a light source device according to a first embodiment.

FIG. 1 is a conceptual view illustrating a light source device 200 according to the present embodiment. The light source device 200 according to the present embodiment includes an excitation light source 210, a fluorescent wheel 100, a driving device 220, and a shielding member 240. In FIG. 1, in addition to the above, a lens and a mirror are provided, but may not be provided depending on design of the light source device 200. Moreover, the lens and the mirror may be integrated with a light guide optical system 310 (described below) of a projector 300. Note that, since FIG. 1 is the conceptual view, the shielding member 240 illustrated in FIG. 1 is one part, and a shape thereof is not exact.

The excitation light source 210 radiates light (excitation light) of a predetermined wavelength band to the fluorescent wheel 100. Various ranges are able to be used for the wavelength band of the excitation light, which is radiated by the excitation light source 210, in accordance with the design of the light source device 200. As an excitation light source for exciting a phosphor of, for example, YAG:Ce, LuAG:Ce, or the like, a blue light source is able to be used, and a blue laser diode (LD) is preferably used.

The fluorescent wheel 100 absorbs the excitation light radiated from the excitation light source 210, and radiates light of a predetermined wavelength band or emits the excitation light as it is. FIG. 1 illustrates the light source device 200 that uses the fluorescent wheel 100 of a reflection type, which is configured to take out a single color, but the fluorescent wheel 100 may be a transmissive type, or may be configured so that the fluorescent wheel 100 that takes out a plurality of colors takes out the excitation light by a transmission portion and takes out emitted light (fluorescence) of a predetermined wavelength band by a reflection portion including a phosphor layer. Details of the fluorescent wheel 100 will be described later.

The driving device (wheel motor) 220 is controlled with an electrical signal and rotationally moves (rotates or stops) the fluorescent wheel 100 through a rotation shaft 225 of the driving device 220. Thereby, a position of a phosphor layer 130 of the fluorescent wheel 100, which is irradiated with excitation light, varies, the phosphor layer 130 is prevented from being excessively heated, and temperature quenching of the phosphor is able to be suppressed. Moreover, in a case of the fluorescent wheel 100 that includes a phosphor layer which radiates different light when receiving the same excitation light or that includes the transmission portion or the reflection portion which transmits excitation light as it is or reflects the excitation light, it is possible to take out different colors.

The shielding member 240 is arranged around the excitation light source 210 and the fluorescent wheel 100, and shields excitation light and emitted light (fluorescence). Directions and light intensity of excitation light and fluorescence are controlled by a lens, a mirror, or the like, but excitation light and fluorescence (stray light) which are emitted in a direction that is not intended are also generated.

At this time, the stray light is shielded so as not to be directly emitted to an outside of the light source device 200 in a state where light intensity is not controlled. In particular, excitation light with high density and emitted light of fluorescence at a time of excitation with high density have high light intensity, and are thus dangerous when directly entering a human eye. Therefore, such excitation light and emitted light of fluorescence are required to be shielded.

An opening 250 is provided at a part of the shielding member 240. It is thereby possible to introduce outside air into an inside of the light source device 200 surrounded by the shielding member 240, and also possible to release air in the inside of the light source device 200 to the outside. As a result, it is possible to lower temperature in a space around the fluorescent wheel 100, so that thermal conduction from the fluorescent wheel 100 to air is efficiently performed.

It is preferable that the opening 250 of the shielding member 240 is configured so that excitation light or fluorescence is not emitted therefrom. For example, the opening 250 may be provided at a position from which excitation light or fluorescence is not emitted, or a filter which causes air to pass therethrough but attenuates light and hardly transmits the light may be provided at the opening 250. Moreover, a shape of the opening 250 may be formed so that excitation light or fluorescence is not emitted therethrough. In addition, in order to prevent invasion of waste or dust from outside air, it is preferable that a filter is installed at the opening 250.

A material of the shielding member 240 is preferably one that has a high heat-resisting property, such as metal. The shielding member 240 is able to be manufactured by, for example, casting an aluminum material, but a manufacturing method is not limited thereto.

[Configuration of Fluorescent Wheel]

Figure 2:
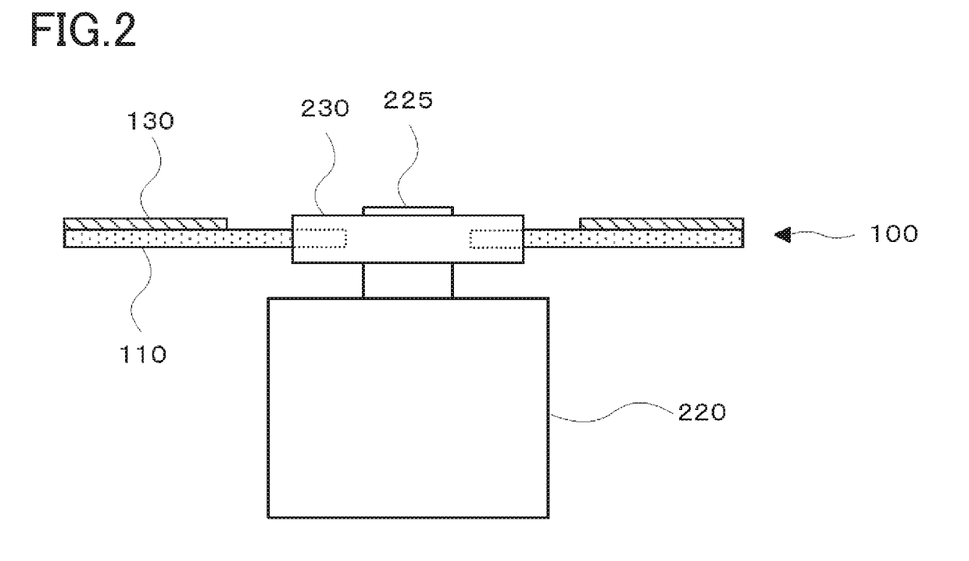
FIG. 2 is a schematic view illustrating a section in a state where a fluorescent wheel used in the light source device according to the first embodiment is fixed to a rotation shaft of a driving device.

FIG. 2 is a schematic view illustrating a section in a state where the fluorescent wheel 100 is fixed to the rotation shaft 225 of the driving device 220. The fluorescent wheel 100 is fixed to the rotation shaft 225 of the driving device 220 by a wheel fixing tool 230.

The wheel fixing tool 230 fixes the fluorescent wheel 100 by nipping a hole-side peripheral edge of the fluorescent wheel 100 in a thickness direction thereof. The rotation shaft 225 is rotated around a central axis by driving force of the driving device 220, and rotates the fluorescent wheel 100. The wheel fixing tool 230 is preferably made of metal. Any method of fixing the fluorescent wheel 100 to the rotation shaft 225 is adoptable. Moreover, as illustrated in FIG. 2, although the fluorescent wheel 100 is fixed to the rotation shaft 225 by using the wheel fixing tool 230 in the present embodiment, a configuration in which the fluorescent wheel 100 is fixed to the rotation shaft 225 with an adhesive or the like and the wheel fixing tool 230 is not used may be provided.

The fluorescent wheel 100 includes a wheel base plate 110 and the phosphor layer 130. The wheel base plate 110 is formed into a disk shape, and has the phosphor layer 130 on a front surface. In accordance with the design of the light source device 200 using the wheel base plate 110, the wheel base plate 110 is able to be formed of metal such as aluminum, copper, or iron, in a case of a reflection type. In addition, in this case, it is preferable that the front surface of the wheel base plate 110 is coated with a high reflection film made of silver or the like. Further, the wheel base plate 110 may be formed of a material which is made without considering reflection of excitation light nor fluorescence, and only the front surface which is irradiated with excitation light may be formed of a reflecting material.

In a case of a transmissive type, the wheel base plate 110 is able to be formed of an inorganic material, such as sapphire or glass, which transmits excitation light. Moreover, since fluorescence emitted by the phosphor is radiated in every direction, in the case of the transmissive type, it is preferable that excitation light is caused to enter the wheel base plate 110 from a surface on which the phosphor layer 130 is not formed and fluorescence is reflected while the excitation light is transmitted. In addition, whether the wheel base plate 110 is the reflection type or the transmissive type, it is preferable that the wheel base plate 110 has high thermal conductivity in order to suppress temperature quenching of the phosphor. Therefore, the wheel base plate 110 is preferably formed of aluminum or sapphire. Further, the wheel base plate 110 may be formed by a combination of the reflection type and the transmissive type.

Figure 3:
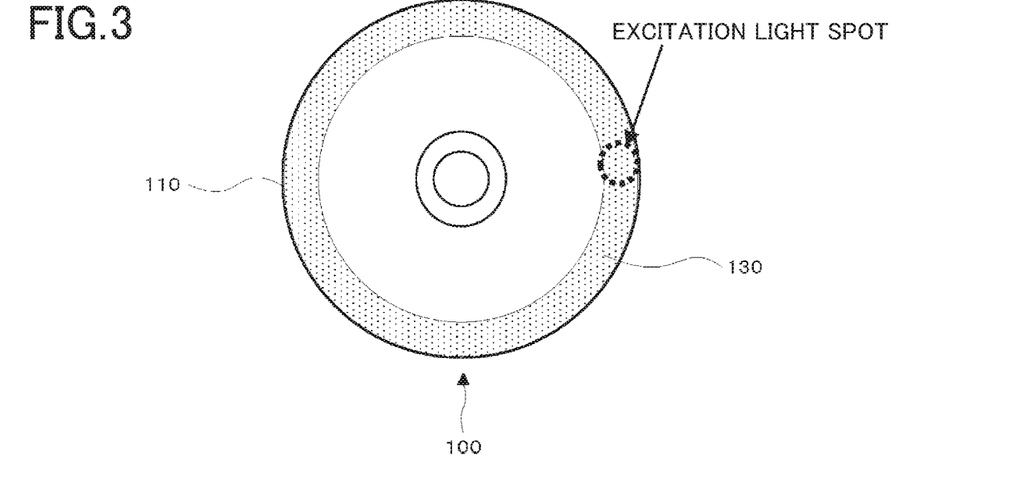
FIG. 3 is a schematic view illustrating an example of the fluorescent wheel used in the light source device according to the first embodiment.

FIG. 3 is a schematic view when an arrangement surface of the phosphor layer of the fluorescent wheel 100 is viewed from the front. The phosphor layer 130 is arranged in a circumferential direction at least along a part (excitation light spot) which is irradiated with excitation light.

The fluorescent wheel 100 may be configured so that the wheel base plate 110 has a plurality of segment regions which are arranged in the circumferential direction and, when the same excitation light is received, light having a different wavelength is able to be taken out from each of the segment regions. Moreover, one or more of the plurality of segment regions may be set as a region in which no phosphor layer 130 is provided and which transmits or reflects excitation light. Thereby, it is possible to use the excitation light as it is and, for example, to directly take out blue excitation light as blue light. Further, even when the fluorescent wheel 100 includes only one phosphor layer 130, a configuration in which a plurality of colors are taken out by a filter is also able to be provided.

Figure 4:
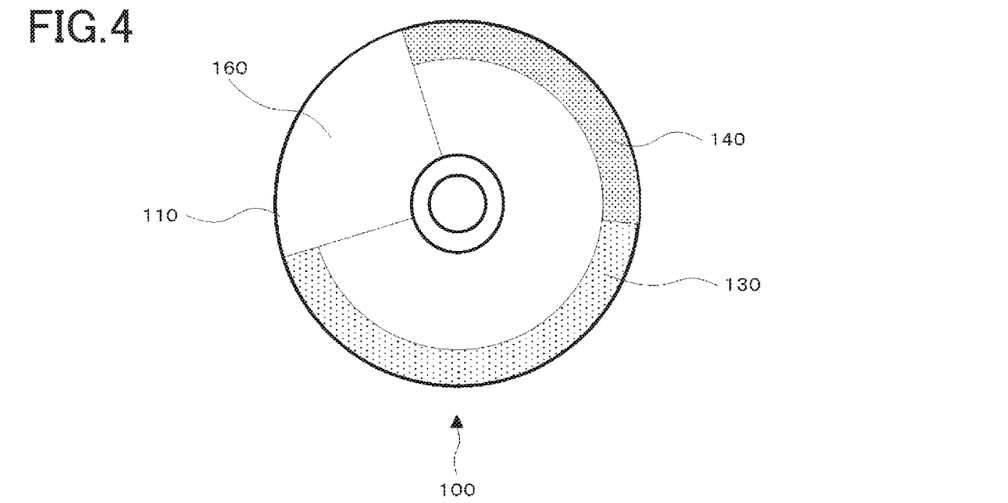
FIG. 4 is a schematic view illustrating a modified example of the fluorescent wheel used in the light source device according to the first embodiment.

FIG. 4 is a schematic view when an arrangement surface of phosphor layers of the fluorescent wheel 100 of a modified example is viewed from the front. The phosphor layer 130 and a phosphor layer 140 by each of which, when the same excitation light is received, light having a different wavelength is able to be taken out are included, and a transmission portion 160 that transmits the excitation light is included.

Figure 5:
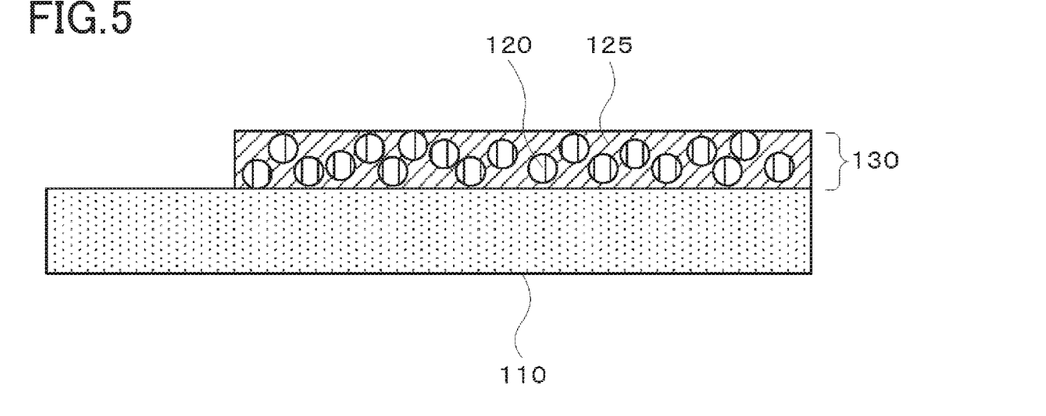
FIG. 5 is a schematic view in which a section of a part of a phosphor layer of the fluorescent wheel used in the light source device according to the first embodiment is enlarged.

FIG. 5 is a schematic view in which a section of a part of the phosphor layer 130 of the fluorescent wheel 100 is enlarged. The phosphor layer 130 includes phosphor particles 120 and a binder 125, and the phosphor particles 120 are dispersed in the binder 125. The phosphor particles 120 absorb predetermined excitation light and emit light of a predetermined wavelength band.

Any phosphor is able to be used in accordance with the design of the light source device. For example, the phosphor may be formed by a garnet-based material having alumina as a basic material. As the garnet-based material, YAG:Ce (yellow light emitting phosphor), LuAG:Ce (green light emitting phosphor), and the like are able to be used. It is preferable that the phosphor is formed by a substance expressed by a general formula of $(RE_{1-x}Ce_x)_3Al_5O_{12}$ and RE includes at least one chemical element selected from a rare-earth element group. Concentration x of a light emission center element Ce with respect to rare earth RE is referred to as light emission center concentration. In addition thereto, as the phosphor, SiAlON, $Zn_2SiO_4$:Mn, (Y, Gd)$BO_3$:Tb, (Y, Gd)$BO_3$:Eu, $YPVO_4$:Eu, and the like are able to be used. Note that, the above is merely an example, and the phosphor used in the fluorescent wheel 100 of the light source device 200 of the invention is not limited to the aforementioned example.

Figure 6:
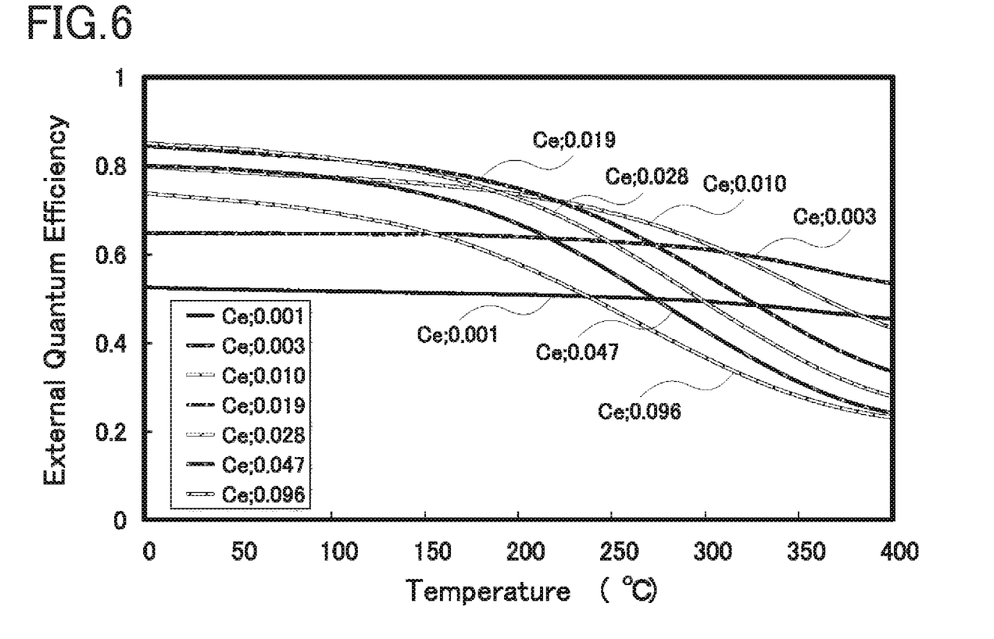
FIG. 6 is a graph indicating an example of temperature dependency of external quantum efficiency of a phosphor (YAG:Ce).

FIG. 6 is a graph indicating external quantum efficiency of YAG:Ce with respect to temperature. As illustrated in FIG. 6, a phosphor generally has temperature characteristics that, when temperature is lowered, external quantum efficiency becomes high, that is, light emission efficiency becomes high. The following formula (1) is a fundamental equation related to thermal radiation. In the formula (1), in a case where temperature $T_A$ of a wheel is constant, when temperature $T_B$ of a periphery is raised, an amount of heat radiation Q is reduced. Accordingly, heat is less likely to be released.

[Expression 1]

$$Q = A \cdot \varepsilon \cdot \sigma \cdot (T_A^4 - T_B^4) \quad (1)$$

Q: amount of heat radiation
A: area of radiation portion
ε: emissivity
σ: Stefan-Boltzman constant
$T_A$: temperature of radiation portion
$T_B$: temperature of periphery Excitation light with high density and emitted light of fluorescence at a time of excitation with high density have high light intensity, so that a fluorescent wheel is usually installed in a sealed space for safety of surroundings. Since the fluorescent wheel is rotationally driven, it is difficult to make the fluorescent wheel directly contact with a cooling portion, so that the fluorescent wheel is cooled by heat exchange with surrounding atmosphere. However, thermal conductivity of air is low, so that, when temperature in the sealed space is raised, heat is not able to be effectively exhausted from the fluorescent wheel for the aforementioned reason.

The light source device according to the present embodiment is able to introduce outside air from the opening and release inside air from the opening, and is thus able to lower temperature around the fluorescent wheel. As a result, thermal conduction from the fluorescent wheel to the air is efficiently performed, so that light emission efficiency of the phosphor is improved in accordance with a temperature decrease. It is therefore possible to achieve stable high-intensity light emission even when excitation light with high density is used for the excitation light source or even when the light source device is operated for a long time.

Second Embodiment

[Configuration of Light Source Device]

Figure 7:
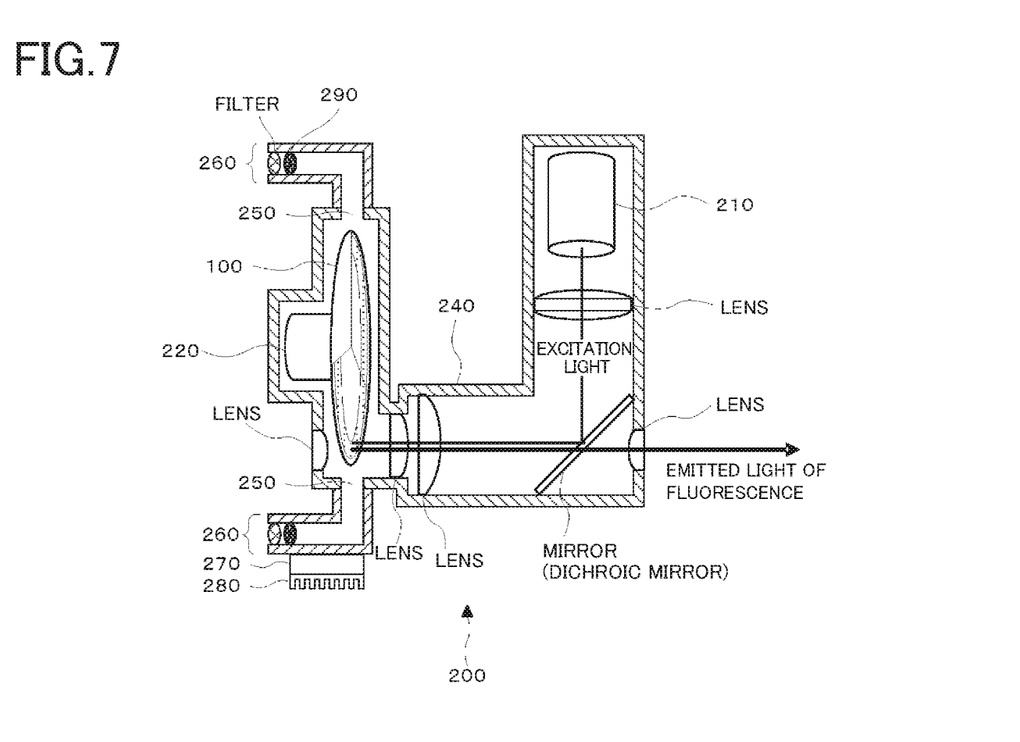
FIG. 7 is a conceptual view of a light source device according to a second embodiment.

FIG. 7 is a conceptual view of the light source device 200 according to the present embodiment. In the present embodiment, a configuration in which at least two cooling pipes 260 are provided at openings 250 of the shielding member 240 in the first embodiment and air intake and air exhaust are performed through the cooling pipes 260 is provided. By including at least two cooling pipes 260, it is possible to perform air intake and air exhaust by the different cooling pipes 260, and a flow of air is generated around the fluorescent wheel 100, thus making it possible to more efficiently lower temperature around the fluorescent wheel 100. The configuration is similar to that of the first embodiment, except for the cooling pipes 260. Note that, FIG. 7 illustrates the configuration in which the fluorescent wheel 100 that is able to take out a plurality of colors is used. In addition, since FIG. 7 is the conceptual view, the shielding member 240 illustrated in FIG. 7 is one part, and a shape thereof is not exact.

Figure 8:
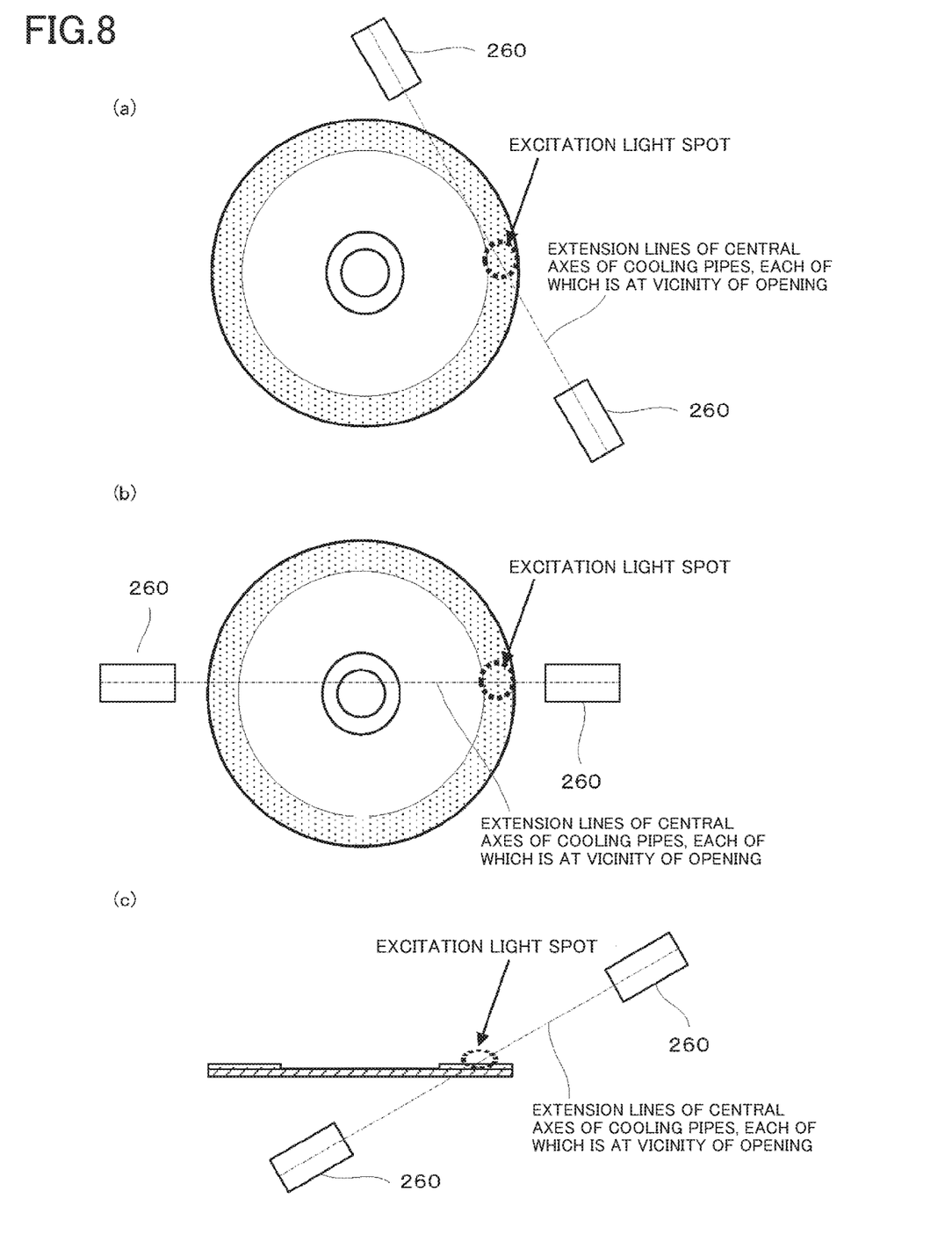
FIGS. 8(a) to 8(c) are schematic views each illustrating a preferable positional relationship of cooling pipes and an excitation light irradiation position.

It is preferable that at least one cooling pipe 260 is arranged so that an excitation light irradiation position of the fluorescent wheel is on an extension line of a central axis of the cooling pipe 260, which is at a vicinity of the opening. Thereby, a flow of air is generated at the excitation light irradiation position of the fluorescent wheel 100, at which temperature is highest, so that it is possible to efficiently cool the excitation light irradiation position. Moreover, it is further preferable that extension lines of central axes of the cooling pipe 260 for air intake and the cooling pipe 260 for air exhaust, each of which is at a vicinity of the opening, substantially coincide with each other and arrangement is performed so that the excitation light irradiation position of the fluorescent wheel 100 is on the extension lines. FIGS. 8(a) to 8(c) are schematic views each illustrating that the extension lines of the central axes of the cooling pipe 260 for air intake and the cooling pipe 260 for air exhaust, each of which is at the vicinity of the opening, substantially coincide with each other and arrangement is performed so that the excitation light irradiation position of the fluorescent wheel 100 is on the extension lines. Alternatively, a flow of air may be generated at the excitation light irradiation position by the shape of the shielding member 240.

Each of the cooling pipes 260 is preferably bent or curved so that there is no linear optical path which connects one end and the other end of the cooling pipe 260 while passing through an inside thereof. Moreover, an inner wall of the cooling pipe 260 preferably has optical characteristics that absorb or scatter excitation light and emitted light of fluorescence. Thereby, it is possible to prevent excitation light or fluorescence (stray light) that is emitted in a direction which is not intended from being directly emitted to the outside of the light source device 200. Even when there is light that passes through the inside of the cooling pipe 260, the light collides with the inner wall of the cooling pipe 260, so that the light is scattered or absorbed by the inner wall and intensity of light emitted to the outside is attenuated.

Figure 9:
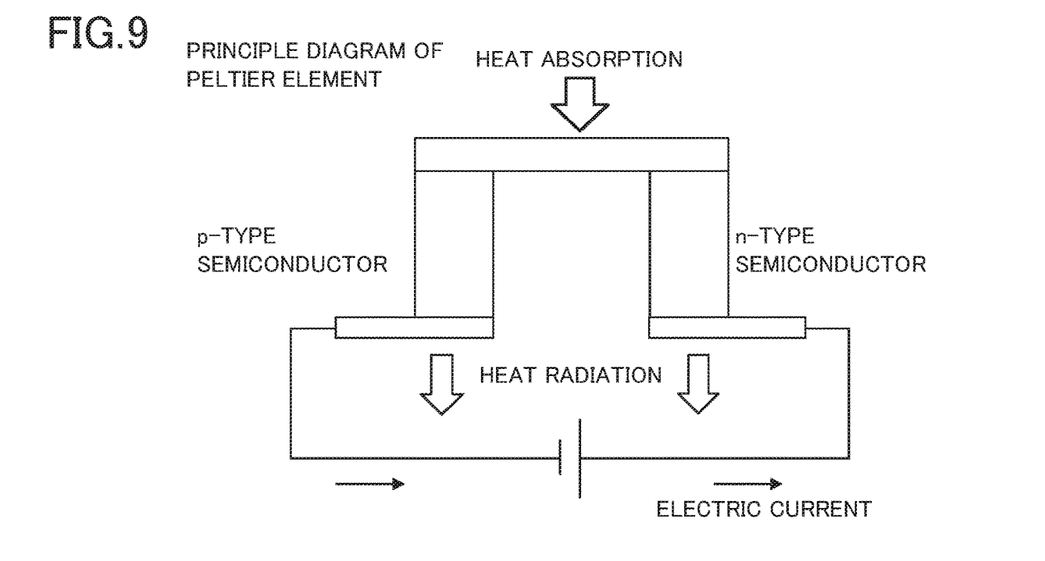
FIG. 9 is a principle diagram of a Peltier element.

At least one cooling pipe 260 that performs air intake may be provided with an electronic cooler 270. Thereby, temperature around the fluorescent wheel 100 is lowered by introducing cooled air, and thermal conduction from the fluorescent wheel 100 to air is more efficiently performed. For the electronic cooler 270, a Peltier element is able to be used. FIG. 9 is a principle diagram of the Peltier element. The Peltier element absorbs heat from a heat absorbing side and radiates heat from a heat radiating side by causing an electric current to flow. That is, it is possible to lower temperature of an object that is in contact with the heat absorbing side.

In a case where the electronic cooler 270 is provided, it is preferable that a shape of the cooling pipe 260 is changed or curved so that a contact area of the cooling pipe 260 and the electronic cooler 270 becomes large. For example, by making a section of the cooling pipe 260 flat or causing the cooling pipe 260 to wind, it is possible to make the contact area of the cooling pipe 260 and the electronic cooler 270 large. Moreover, a heat sink 280 is preferably provided on the heat radiating side of the electronic cooler 270.

The cooling pipe 260 is preferably provided with a cooling fan 290 that compulsorily generates an air current. The cooling fan 290 may be provided only on one cooling pipe 260 or may be provided on each of a plurality of cooling pipes 260. Moreover, an air current may be generated by varying thicknesses of the cooling pipe 260 of an air intake side and the cooling pipe 260 of an air exhaust side. In addition, the cooling pipe 260 is preferably provided with a filter in order to prevent invasion of waste or dust from outside air.

A material of the cooling pipes 260 is preferably one that has a high heat-resisting property, such as metal. The cooling pipe 260 is able to be manufactured by, for example, casting an aluminum material, but a manufacturing method is not limited thereto. Moreover, the shielding member 240 and the cooling pipe 260 may be integrally molded.

By including the cooling pipes, the light source device according to the present embodiment is able to reliably lower temperature around the fluorescent wheel, so that thermal conduction from the fluorescent wheel to air is more efficiently performed. As a result, light emission efficiency of the phosphor is improved in accordance with a temperature decrease, and it is therefore possible to achieve more stable high-intensity light emission even when excitation light with high density is used or even when the light source device is operated for a long time.

Third Embodiment

[Configuration of Light Source Device]

Figure 10:
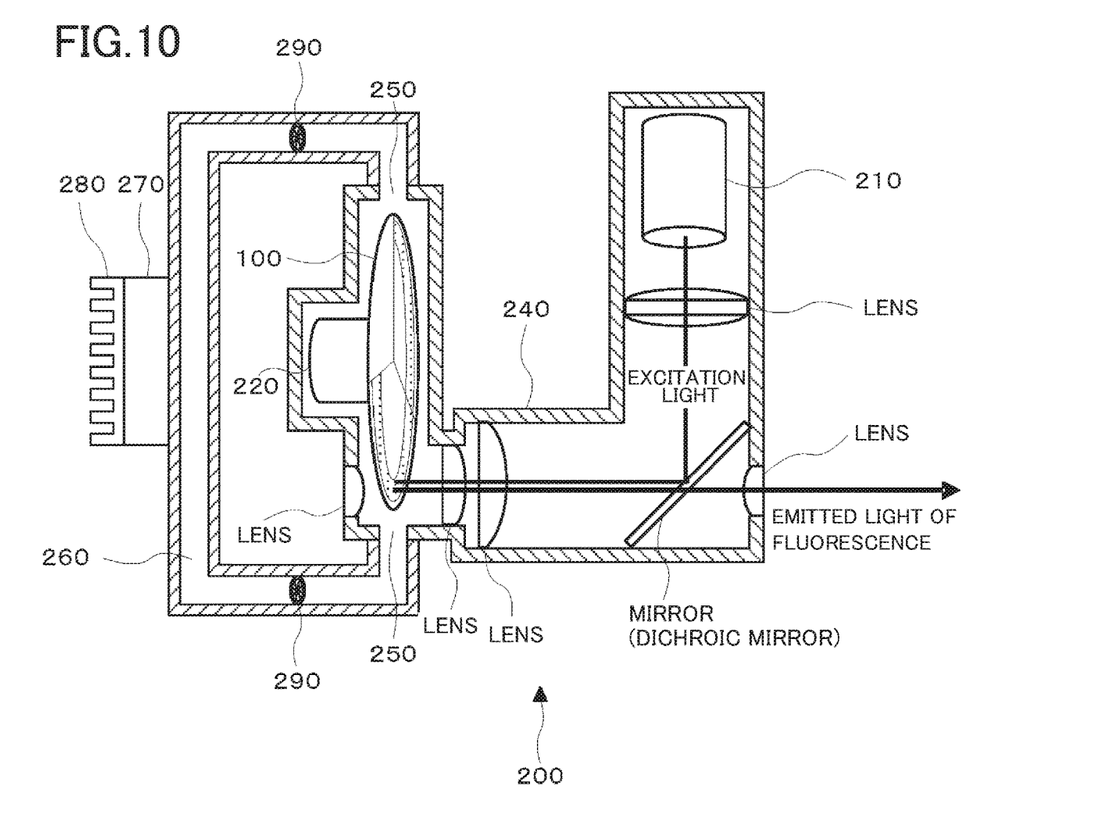
FIG. 10 is a conceptual view of a light source device according to a third embodiment.

FIG. 10 is a conceptual view of the light source device 200 according to the present embodiment. In the present embodiment, a configuration which includes the cooling pipe 260 that is connected to the opening 250 of the shielding member 240 so as to be able to circulate gas in an inside of the shielding member 240 and the electronic cooler 270 that is in contact with a part of an outside of the cooling pipe 260 is provided. The configuration is similar to that of the first embodiment, except for the cooling pipe 260. Note that, FIG. 10 illustrates a configuration in which the fluorescent wheel 100 that is able to take out a plurality of colors is used. In addition, since FIG. 10 is the conceptual view, the shielding member 240 illustrated in FIG. 10 is one part, and a shape thereof is not exact.

In a case where two openings 250 to which the cooling pipe 260 is connected are provided as in FIG. 10, by connecting the two openings 250 such that the cooling pipe 260 extends from a connection part with one of the openings 250 to a part opposite to the connection part, a flow channel of gas is provided. Thereby, it is possible to circulate gas in the inside of the shielding member 240. In addition, in a case where three or more openings 250 are provided, by connecting at least two of the three or more openings 250 such that at least two cooling pipes among them each extend from a connection part with one of these two openings 250 to a part opposite to the connection part, it is possible to circulate gas in the inside of the shielding member 240. At this time, three cooling pipes or more may be connected or a plurality of flow channels of gas may be provided. Further, the opening 250 and the cooling pipe 260 through which outside air is introduced may be provided, but, in such a case, a measure against stray light or a measure against dust is required.

The electronic cooler 270 is in contact with at least a part of the outside of the cooling pipe 260 which serves as the flow channel of gas as described above. A Peltier element is able to be used for the electronic cooler 270. It is preferable that the shape of the cooling pipe 260 is changed or curved so that the contact area of the cooling pipe 260 and the electronic cooler 270 becomes large. Moreover, the heat sink 280 is preferably provided on the heat radiating side of the electronic cooler 270.

Also in the present embodiment, it is preferable that a portion of at least one cooling pipe 260 serving as the flow channel of gas, which is connected to the opening 250 of the shielding member 240, is arranged so that an excitation light irradiation position of the fluorescent wheel 100 is on an extension line of a central axis of the cooling pipe 260, which is at a vicinity of the opening. Moreover, it is further preferable that extension lines of central axes of the cooling pipe 260 through which gas flows into and the cooling pipe 260 through which gas flows out, each of which is at the vicinity of the opening, substantially coincide with each other and arrangement is performed so that the excitation light irradiation position of the fluorescent wheel 100 is on the extension lines. Alternatively, a flow of air may be generated at the excitation light irradiation position by the shape of the shielding member 240. Further, the cooling pipe 260 is preferably provided with the cooling fan 290 that compulsorily generates an air current.

By circulating cooled air, the light source device according to the present embodiment is able to reliably lower temperature around the fluorescent wheel, so that thermal conduction from the fluorescent wheel to air is more efficiently performed. As a result, light emission efficiency of the phosphor is improved in accordance with a temperature decrease, and it is therefore possible to achieve more stable high-intensity light emission even when excitation light with high density is used or even when the light source device is operated for a long time. Moreover, since excitation light or fluorescence does not leak out of the light source device, it is possible to enhance safety. Further, since outside air does not enter, it is possible to prevent invasion of waste or dust, thus making it possible to reduce risk of a malfunction.

Fourth Embodiment

[Configuration of Projector]

Figure 11:
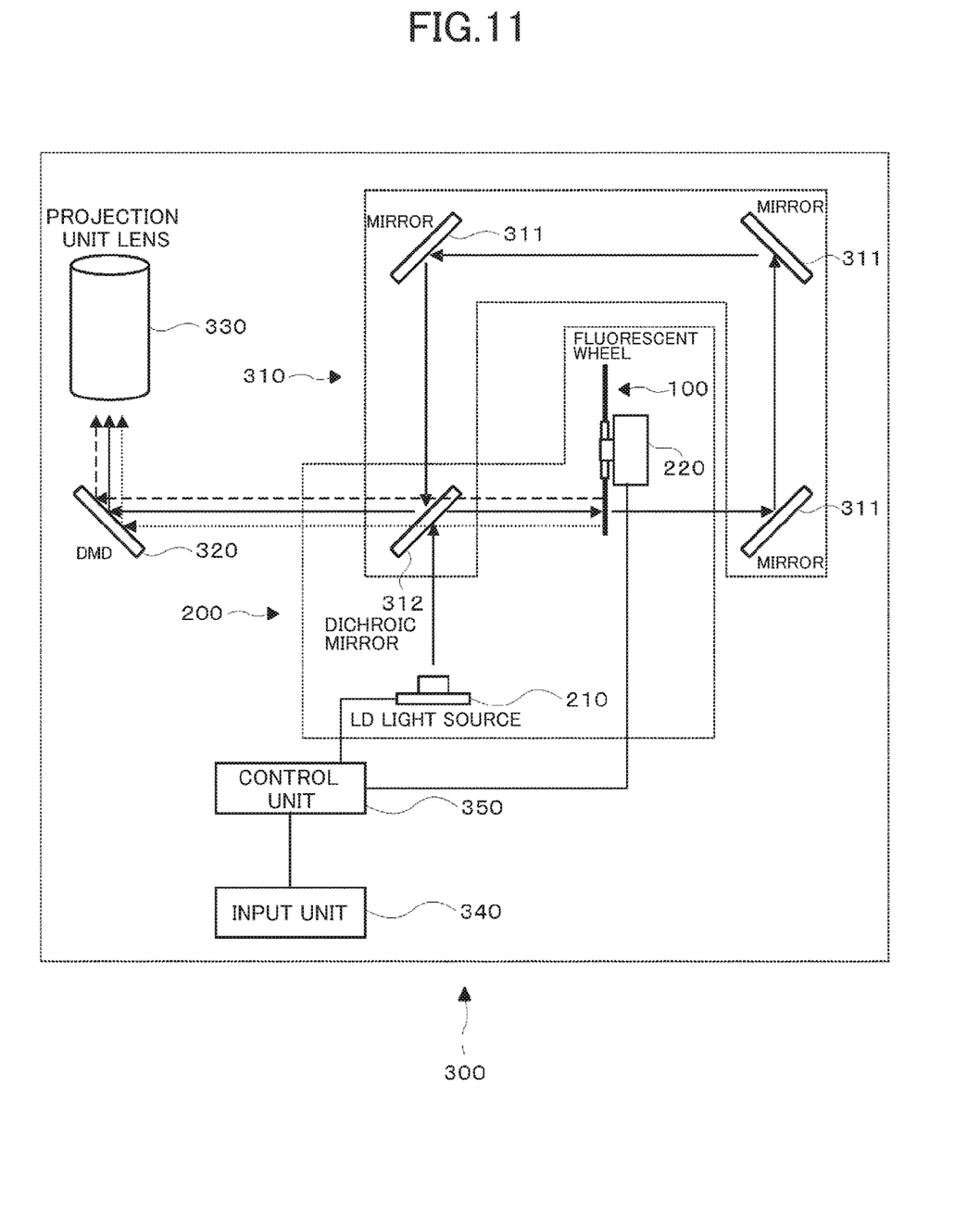
FIG. 11 is a conceptual view illustrating a projector according to a fourth embodiment.

FIG. 11 is a conceptual view illustrating the projector 300 according to the present embodiment. The projector 300 according to the present embodiment includes the light source device 200, the light guide optical system 310, a display element 320, a projection optical system 330, an input unit 340, and a control unit 350. The light source device 200 is the light source device 200 according to any of the first to the third embodiments. Note that, FIG. 11 does not illustrate, for example, the shielding member 240, the opening 250, nor the cooling pipe 260.

The light guide optical system 310 guides light, which is radiated from the light source device 200, to the display element 320. The light guide optical system 310 is constituted by a plurality of mirrors 311 or a dichroic mirror 312, and a plurality of lenses which are not illustrated in FIG. 11. Note that, in FIG. 11, the dichroic mirror 312 is also an element that constitutes the light source device 200.

The display element 320 performs display by using the light guided by the light guide optical system 310. The display element 320 is controlled by the control unit 350, and displays an image based on data which is received by the input unit 340. For the display element 320, for example, a DMD (Digital Micromirror Device), a liquid crystal light valve, or the like is able to be used.

The projection optical system 330 projects display of the display element 320 to an outside of the projector 300. The projection optical system 330 is constituted by a plurality of lenses (not illustrated). In the projection optical system 330, a part of the lenses is movable by a motor or the like, and, when the projection optical system 330 is controlled by the control unit 350, adjustment of zoom, a focus, and the like is performed. Note that, the conceptual view of FIG. 11, which illustrates the projector 300, is an example, both of the light guide optical system 310 and the projection optical system 330 are modified into various forms in accordance with design of the fluorescent wheel 100, the light source device 200, and the projector 300.

The input unit 340 receives an input of data of an image to be projected and transfers the input data to the control unit 350. The input unit 340 may receive data from equipment different from the projector 300. Moreover, the input unit 340 may be connected to the Internet or the like and receive data by communication. In addition, the input unit 340 receives an operation performed by a user and transfers input operation data to the control unit 350.

The control unit 350 controls the light source device 200, the display element 320, and the projection optical system 330 in order to project the image on the basis of the data received by the input unit 340. The light guide optical system 310 may be fixed or may be configured so as to be controlled by the control unit 350.

The projector according to the present embodiment is able to maintain projection illuminance to be high by using the light source device light intensity of which is high and which suppresses temperature quenching, and is able to achieve an excellent projection image even in an environment where there is external light.

Fifth Embodiment

[Configuration of Projector]

Figure 12:
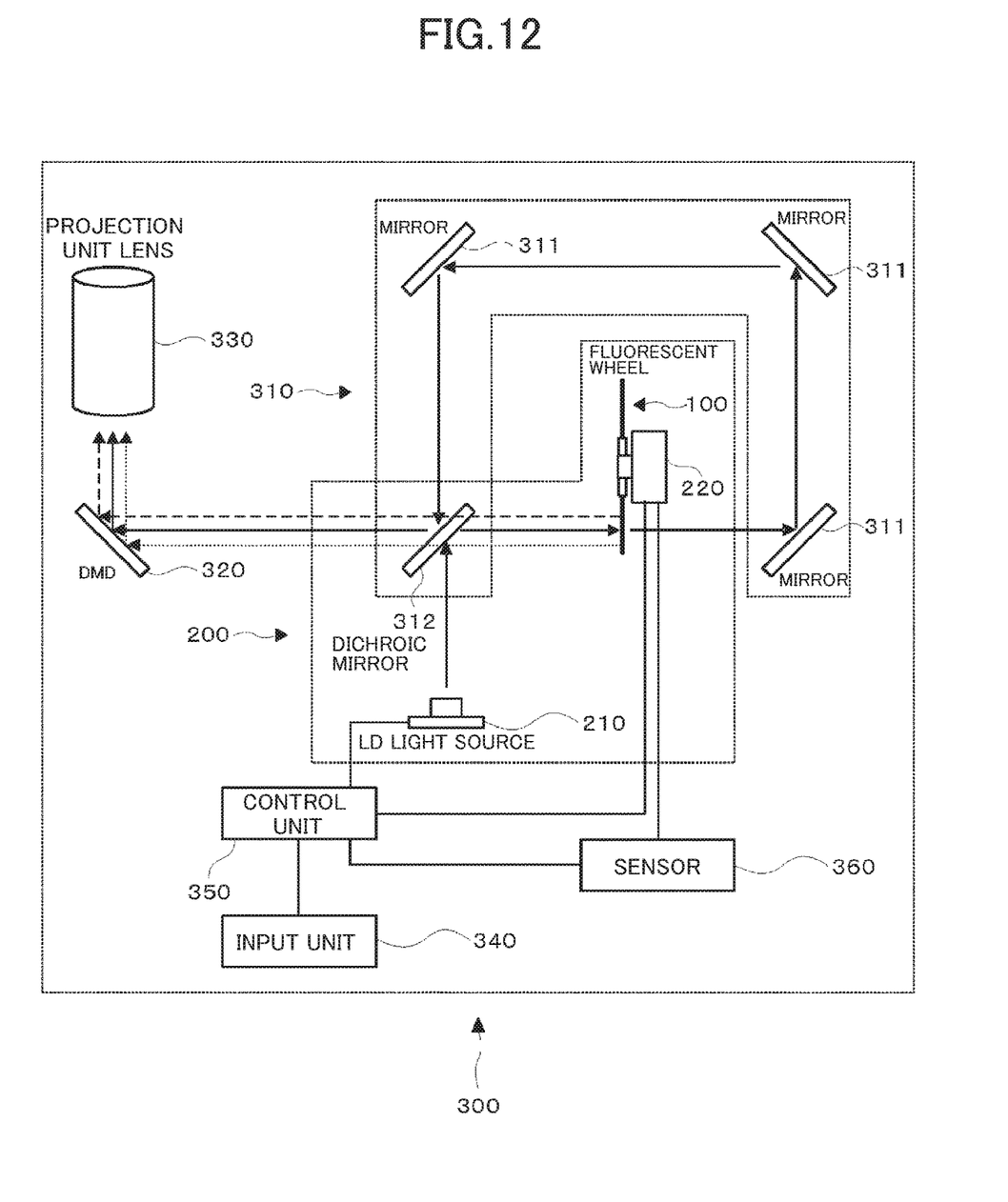
FIG. 12 is a conceptual view illustrating a projector according to a fifth embodiment.

FIG. 12 is a conceptual view illustrating the projector 300 according to the present embodiment. The projector 300 according to the present embodiment includes the light source device 200, the light guide optical system 310, the display element 320, the projection optical system 330, a sensor 360, the input unit 340, and the control unit 350. Note that, FIG. 12 does not illustrate, for example, the shielding member 240, the opening 250, nor the cooling pipe 260.

The light source device 200 includes the excitation light source 210, the fluorescent wheel 100 according to the second embodiment, and the driving device 220. Configurations of them are similar to those of the second and the fourth embodiments.

Configurations of the light guide optical system 310, the display element 320, the projection optical system 330, and the input unit 340 are similar to those of the fourth embodiment.

The sensor 360 acquires information of a rotation position of the fluorescent wheel 100 of the light source device 200. The sensor 360 notifies the control unit 350 of the acquired positional information.

The control unit 350 controls the light source device 200, the display element 320, the light guide optical system 310, and the projection optical system 330 in order to project an image on the basis of data received by the input unit 340. Moreover, the control unit 350 controls an output of the excitation light source 210 in accordance with a color and gray scale of brightness of a projection image to be output and the positional information of the fluorescent wheel 100, which is acquired by the sensor 360.

By controlling an output of excitation light in accordance with the color and the gray scale of brightness, the projector according to the present embodiment is able to suppress deterioration of the excitation light source and the fluorescent wheel. Moreover, since there is no necessity to attenuate unnecessary light, it is possible to suppress heat generation in an inside of the projector.

Note that, a technical range of the invention is not limited to the aforementioned embodiments, and is able to be variously modified within a range not departing from the gist of the invention.

An embodiment of the invention may adopt a configuration as described below. That is, (1) a light source device of an embodiment of the invention is a light source device that radiates excitation light or emitted light by the excitation light, including: an excitation light source that radiates the excitation light; a fluorescent wheel that includes a phosphor, which emits light in a predetermined wavelength range on reception of the excitation light, in a circumferential direction; a driving device that rotates the fluorescent wheel; and a shielding member that is arranged around the excitation light source and the fluorescent wheel and shields the excitation light and the emitted light, in which an opening through which outside air is introduced is provided at a part of the shielding member.

Thereby, temperature around the fluorescent wheel is lowered by directly introducing outside air, and thermal conduction from the fluorescent wheel to air is efficiently performed. As a result, light emission efficiency of the phosphor is improved in accordance with a temperature decrease, and it is therefore possible to achieve stable high-intensity light emission even when excitation light with high density is used for the excitation light source or even when the light source device is operated for a long time.

(2) Moreover, in the light source device of an embodiment of the invention, at least two cooling pipes are provided at openings through which outside air is introduced and which are provided at parts of the shielding member, and air intake and air exhaust are performed by the cooling pipes.

Thereby, air intake and air exhaust are able to be performed by different cooling pipes, a flow of air is generated around the fluorescent wheel, and it is possible to more efficiently lower temperature around the fluorescent wheel.

(3) Moreover, a light source device of an embodiment of the invention is a light source device that radiates excitation light or emitted light by the excitation light, including: an excitation light source that radiates the excitation light; a fluorescent wheel that includes a phosphor, which emits light in a predetermined wavelength range on reception of the excitation light, in a circumferential direction; a driving device that rotates the fluorescent wheel; a shielding member which is arranged around the excitation light source and the fluorescent wheel, at a part of which openings are provided, and which shields the excitation light and the emitted light; a cooling pipe connected to the openings of the shielding member so as to circulate gas in an inside of the shielding member; and an electronic cooler in contact with a part of an outside of the cooling pipe.

Thereby, temperature around the fluorescent wheel is more reliably lowered by circulating cooled air, and thermal conduction from the fluorescent wheel to air is more efficiently performed. As a result, light emission efficiency of the phosphor is improved in accordance with a temperature decrease, and it is therefore possible to achieve more stable high-intensity light emission even when excitation light with high density is used for the excitation light source or even when the light source device is operated for a long time. Moreover, since excitation light or fluorescence does not leak out of the light source device, it is possible to enhance safety. Further, since outside air does not enter, it is possible to prevent invasion of waste or dust, thus making it possible to reduce risk of a malfunction.

(4) Moreover, in the light source device of an embodiment of the invention, at least one of the cooling pipes is arranged so that an excitation light irradiation position of the fluorescent wheel is on an extension line of a central axis of the cooling pipe, which is at a vicinity of the opening.

Thereby, it is possible to efficiently cool the excitation light irradiation position of the fluorescent wheel, at which temperature is highest.

(5) Moreover, in the light source device of an embodiment of the invention, each of the cooling pipes is bent or curved so that there is no linear optical path connecting one end and another end of the cooling pipe and passing through an inside of the cooling pipe.

Thereby, it is possible to prevent excitation light or fluorescence that is emitted in a direction which is not intended from being directly emitted to an outside of the light source device. Even when there is light that passes through the inside of the cooling pipe, the light collides with an inner wall of the cooling pipe, so that the light is scattered or absorbed by the inner wall and intensity of light emitted to the outside is attenuated.

(6) Moreover, in the light source device of an embodiment of the invention, an electronic cooler is provided on at least one of the cooling pipes, which performs air intake.

Thereby, temperature around the fluorescent wheel is lowered by intake of cooled air, and thermal conduction from the fluorescent wheel to air is more efficiently performed.

(7) Moreover, in the light source device of an embodiment of the invention, the fluorescent wheel includes a plurality of segment regions arranged in the circumferential direction, and, when identical excitation light is received, different light is able to be taken out from each of the segment regions.

Thereby, it is possible to take out light of different colors by one fluorescent wheel.

(8) Moreover, a projector of an embodiment of the invention includes: the light source device according to any of (1) to (7) described above; a light guide optical system that guides light radiated from the light source device; a display element that performs display by using the light guided by the light guide optical system; a projection optical system that projects the display outside; and a control unit that controls the light source device, the display element, and each of the optical systems.

Thereby, it is possible to maintain projection illuminance to be high by using the light source device light intensity of which is high and which suppresses temperature quenching, and to achieve an excellent projection image even in an environment where there is external light.

(9) Moreover, a projector of an embodiment of the invention includes: the light source device according to (7) described above; a light guide optical system that guides light radiated from the light source device; a display element that performs display by using the light guided by the light guide optical system; a projection optical system that projects the display outside; a control unit that controls the light source device, the display element, and each of the optical systems; a sensor that acquires a rotation position of the fluorescent wheel; and an output control unit that controls an output of the excitation light source, in which the output control unit controls the output of the excitation light source in accordance with a color and gray scale of brightness of a projection image to be output and positional information of the fluorescent wheel, which is acquired by the sensor.

Thereby, it is possible to suppress deterioration of the excitation light source and the fluorescent wheel by controlling an output of excitation light in accordance with the color and the gray scale of brightness. Moreover, since there is no necessity to attenuate unnecessary light, it is possible to suppress heat generation in an inside of the projector.

The invention claimed is:

1. A light source device that radiates excitation light or emitted light by the excitation light, comprising:
    an excitation light source that radiates the excitation light;
    a fluorescent wheel that includes a phosphor, which emits light in a predetermined wavelength range on reception of the excitation light, in a circumferential direction;
    a driving device that rotates the fluorescent wheel; and
    a shielding member that is arranged around the excitation light source and the fluorescent wheel and shields the excitation light and the emitted light, wherein
    an opening through which outside air is introduced is provided at a part of the shielding member, and
    a space between the opening and the fluorescent wheel is not shielded.

2. The light source device according to claim 1, wherein
    at least two cooling pipes are provided at openings through which outside air is introduced and which are provided at parts of the shielding member, and
    air intake and air exhaust are performed by the cooling pipes.

3. The light source device according to claim 2, wherein at least one of the cooling pipes is arranged so that an excitation light irradiation position of the fluorescent wheel is on an extension line of a central axis of the cooling pipe, which is at a vicinity of the opening.

4. The light source device according to claim 2, wherein each of the cooling pipes is bent or curved so that there is no linear optical path connecting one end and another end of the cooling pipe and passing through an inside of the cooling pipe.

5. The light source device according to claim 2, wherein an electronic cooler is provided on at least one of the cooling pipes, which performs air intake.

6. The light source device according to claim 1, wherein the fluorescent wheel includes a plurality of segment regions arranged in the circumferential direction, and, when identical excitation light is received, different light is able to be taken out from each of the segment regions.

7. A projector comprising:
    the light source device according to claim 1;
    a light guide optical system that guides light radiated from the light source device;
    a display element that performs display by using the light guided by the light guide optical system;
    a projection optical system that projects the display outside; and
    a control unit that controls the light source device, the display element, and each of the optical systems.

8. A projector comprising:
    the light source device according to claim 6;
    a light guide optical system that guides light radiated from the light source device;
    a display element that performs display by using the light guided by the light guide optical system;
    a projection optical system that projects the display outside;
    a control unit that controls the light source device, the display element, and each of the optical systems;
    a sensor that acquires a rotation position of the fluorescent wheel; and
    an output control unit that controls an output of the excitation light source, wherein
    the output control unit controls the output of the excitation light source in accordance with a color and gray scale of brightness of a projection image to be output and positional information of the fluorescent wheel, which is acquired by the sensor.

9. A light source device that radiates excitation light or emitted light by the excitation light, comprising:
    an excitation light source that radiates the excitation light;
    a fluorescent wheel that includes a phosphor, which emits light in a predetermined wavelength range on reception of the excitation light, in a circumferential direction;
    a driving device that rotates the fluorescent wheel;
    a shielding member which is arranged around the excitation light source and the fluorescent wheel, at a part of which openings are provided, and which shields the excitation light and the emitted light;
    a cooling pipe connected to the openings of the shielding member so as to circulate gas in an inside of the shielding member; and
    an electronic cooler in contact with a part of an outside of the cooling pipe, wherein
    a space between the openings and the fluorescent wheel is not shielded.

* * * * *